United States Patent [19]
Murray et al.

[11] 3,969,481
[45] July 13, 1976

[54] PROCESS FOR GENERATING ULTRA HIGH PURITY $H_2$ OR $O_2$

[75] Inventors: John N. Murray, Lutherville, Md.; Robert J. Hynek, Brookfield, Wis.

[73] Assignee: Isotopes, Inc., Westwood, N.J.

[22] Filed: Nov. 3, 1972

[21] Appl. No.: 303,392

[52] U.S. Cl. .............................. 423/219; 423/248; 423/580
[51] Int. Cl.² .......................................... C01B 13/00
[58] Field of Search .......... 423/219, 248, 579, 648, 423/580; 23/232 R, 288 FB; 252/477 R; 260/669 R

[56] References Cited
UNITED STATES PATENTS

| | | | |
|---|---|---|---|
| 1,596,060 | 8/1926 | Mase | 23/288 PB |
| 1,931,989 | 10/1933 | Jenness | 23/288 FB |
| 2,582,885 | 1/1952 | Rosenblatt | 423/248 |
| 2,787,598 | 4/1957 | Hammar | 423/248 |
| 3,116,970 | 1/1964 | Storp et al. | 423/244 |
| 3,189,406 | 6/1965 | Storp et al. | 423/564 |
| 3,306,711 | 2/1967 | Angerhofer | 423/219 |
| 3,814,799 | 6/1974 | Wygasch | 423/219 |

FOREIGN PATENTS OR APPLICATIONS

| | | | |
|---|---|---|---|
| 633,058 | 1961 | Canada | 423/648 |

*Primary Examiner*—Oscar R. Vertiz
*Assistant Examiner*—Eugene T. Wheelock
*Attorney, Agent, or Firm*—Fleit & Jacobson

[57] ABSTRACT

A purification system for producing extremely pure $H_2$ from $H_2$ gas streams containing water and small amounts of $O_2$ comprises a single column with alternating layers of adsorbent and a catalyst for the reaction $2H_2 + O_2 \rightarrow 2H_2O$. The alternating layers are arranged so that the gas to be purified first meets an adsorbent layer, next a catalyst layer and finally an adsorbent layer. Two such columns can be operated alternatively, one being used to produce purified gas, while the other is backflushed with as little as 2% of the product gas of the operating column. By this technique, $H_2$ gas can be produced having a purity as high as 99.9999% or higher. The inventive system can also be used to purify $O_2$ gas streams containing water and small amounts of hydrogen.

20 Claims, 2 Drawing Figures

PROCESS FOR GENERATING ULTRA HIGH PURITY H₂ OR O₂

BACKGROUND OF THE INVENTION

This invention relates to a method for continuously purifying hydrogen or oxygen gas streams.

Hydrogen can be produced by a variety of methods. For example, metals can be reacted with acidic and basic solutions; organic materials can be dehydrogenated with catalysts; organic materials can be reacted with steam (steam reforming); hydrocarbons or carbonaceous materials can be partially oxidized; and electrolyte solutions can be electrolysed. An example of this last method is more fully disclosed in U.S. Pat. No. 3,410,770. In all cases, the evolved hydrogen product is not pure but contains various impurities such as water, oxygen, hydrocarbons, carbon dioxide, carbon monoxide, nitrogen and occasionally particulate matter such as electrolyte salts.

When an extremely pure hydrogen gas stream is desired, the hydrogen gas products of the above processes are typically purified by physiochemcial or chemical means. One such method involves passing the impure gas stream through a barrier of a solid foil of palladium or palladium alloy, normally less than 0.003 inches thick. Because of the atomic lattice structure of the foil, only hydrogen and small quantities of deuterium pass through. By this technique, the purity of a typical incoming gas stream can be upgraded to as high as 99.999999%.

While this purification method can provide extremely pure hydrogen, it has a number of drawbacks in use which render it unsuitable for many applications. First, palladium or palladium alloy foils are expensive. Moreover, because the lattice structure of the palladium is so "tight", the process usually requires an upstream gas pressure on the order of 100 to 300 psig to produce economically feasible amounts of purified gas. Such high upstream pressures usually necessitate an additional upstream compressor, which adds to the expense of the purification process. Additionally, the process is usually carried at an elevated temperature, typically above about 200°C. This also adds to the expense of the purification process. Also, the process cannot be used to purify all hydrogen gas streams, since hydrogen gas streams containing a few materials, such as hydrogen sulfide, poison the foil. Finally, it is necessary to run the process continually, since repeated heating and cooling of the foil cause it to develop severe cracking and fracturing thereby rendering it useless.

Another method developed to purify hydrogen gas streams is based on physical adsorption. This method is especially effective in removing polar molecules such as water and carbon dioxide and is accomplished by simply passing the contaminated gas through a bed of the adsorbent so that the contaminents are retained on the adsorbent surfaces. Various silica and aluminum compounds formed into solid gels have been used for this purpose, and more recently sodium alumino-silicates, commonly referred in the trade as "molecular sieves", have also been used. These compounds are capable of adsorbing as much as one quarter pound of water per pound of molecular sieves before they pass more than one part per million water into the product gas stream. However, a common drawback asociated with molecular sieves is that they are highly effective only with polar molecules. Thus, they cannot be economically used when the gas to be purified contains a high concentration of non-polar molecules, such as oxygen.

It is also well-known that the removal of oxygen from a hydrogen gas stream can be accomplished catalytically. For example, see U.S. Pat. No. 2,582,885. However, a common drawback associated with catalytic removal of oxygen from a hydrogen gas stream is that the catalysts typically employed are subject to deactivation if contacted with minute amounts of water or other poisons. Thus, when used to purify hydrogen gas generated from an electrolytic hydrogen generator, such as the one taught in U.S. Pat. No. 3,410,770, such catalysts are critically deactivated within about 300 hours.

Oxygen gas streams can also be purified by various techniques. For example, the gas may be cooled to liquification and subsequently distilled and/or redistilled until proper purity is obtained. This approach has well-established technology for the production of extremely large quantities of oxygen; however, application of this technology to moderate and small oxygen production is considered economically unfeasible.

Moreover, systems based on physical adsorption principles have also been proposed for the purification of oxygen. When, for example, molecular sieves are employed, lighter molecular weight components evolve from the adsorbent column first, purified oxygen next and finally higher molecular weight and polar materials evolve last. The purified oxygen product must therefore be removed as a "heart cut", and this technique involves by necessity an excessive multiplicity of adsorption/regeneration columns to successfully produce purified oxygen on a continuous basis.

Selective adsorption of oxygen utilizing selective organo-metallic compounds has also been observed, *Chemistry of the Metal Chelate Compounds*, Martell and Calvin, Prentice-Hall, 1952, pp 336–432, and systems have been constructed to verify that oxygen can be extracted from air. In one such system, the material containing selectively adsorbed oxygen is physically removed to a separate vessel where desorption occurs to yield the oxygen product and the parent adsorbent. The parent adsorbent is subsequently transferred back to the adsorption region and the cyclic process is continued. However, two drawbacks associated with this approach, namely (a) the irreversible oxidation of the adsorbent material thus decreasing the adsorptive properties of the adsorbent and (b) the mechanical fracture of the adsorbent as it undergoes lattice expansion and contraction during the adsorption/desorption cycle, have prevented practical applications of this approach.

Accordingly it is an object of this invention to provide a method and apparatus for removing various impurities from a hydrogen or oxygen gas stream.

It is further object of this invention to provide a method and apparatus for purifying a hydrogen or oxygen gas stream containing both nonpolar and polar contaminants, and especially water.

It is another object of this invention to provide a method and apparatus for removing significant amounts of oxygen and water from a hydrogen gas stream and significant amounts of hydrogen and water from an oxygen gas stream.

It is a particularly preferred object of this invention to provide a simple efficient method and an inexpensive apparatus for purifying the gas products of the apparatus and process shown in U.S. Pat. No. 3,410,770.

It is another object of this invention to provide a simple and inexpensive method and apparatus for producing hydrogen having a purity of as high as 99.9999% and oxygen having a purity of as high as 99.99%.

SUMMARY OF THE INVENTION

These and other objects are accomplished according to the present invention wherein a hydrogen or oxygen gas stream to be purified is passed through single gas column containing alternating layers of an adsorbent and a catalyst promoting the reaction $2H_2 + O_2 \rightarrow 2H_2O$. The layers of adsorbent and catalyst are arranged in the column so that the gas first meets a layer of adsorbent and then alternating layers of catalyst and adsorbent. As the gas passes through the column, most of the water and polar impurities are removed in the first adsorbent layer. In the next layer, a catalyst layer, the oxygen (or hydrogen) impurity in the hydrogen (or oxygen) gas stream is reacted to form water, and in the next layer the water just produced is adsorbed. Because of the positioning of the layers of adsorbent and catalyst, not only can extremely pure hydrogen or oxygen gas streams be produced but also the total amount of impurities removed can be maximized per unit catalyst and adsorbent.

BRIEF DESCRIPTION OF THE DRAWINGS

The nature of the present invention may be better understood by reference to the following drawings wherein.

DETAILED DESCRIPTION

Figure 1:
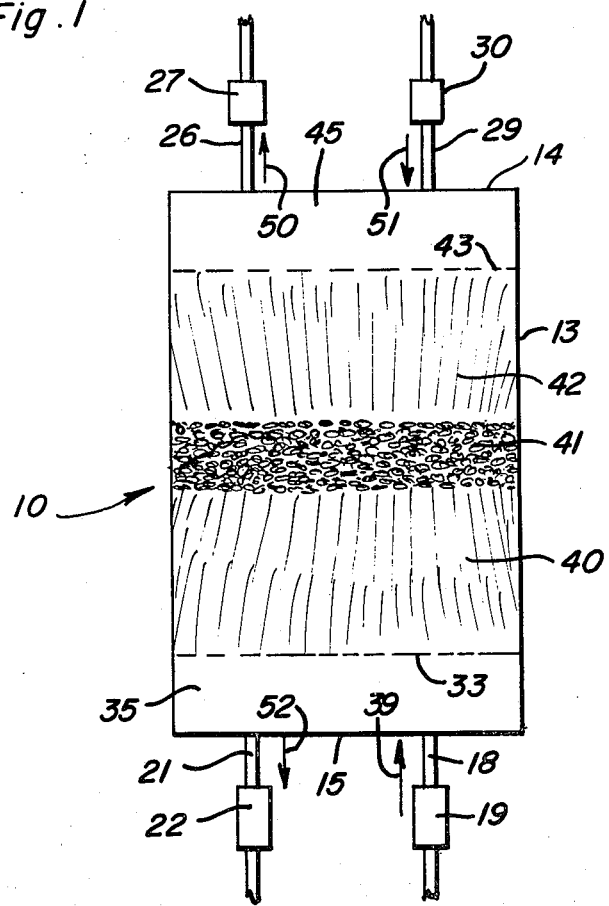
FIG. 1 is a sectional view of the purification column of the present invention.

The inventive purification column is more fully shown in FIG. 1 which shows the column generally shown at 10. The column is composed of an outer shell 13 made from any suitable material such as aluminum or stainless steel, with upper end cap 14 and lower end cap 15. Attached to the lower end cap 15 is a gas inlet conduit 18 having a gas inlet valve 19 attached thereto. Also attached to lower end cap 15 is a backflush outlet conduit 21 having an attached backflush valve 22. Likewise, upper end cap 14 is provided with two conduits, purified gas conduit 26 and its associated valve 27 and main backflush conduit 29 and its associated valve 30.

The internals of the chamber take the following form. Spaced a distance above the lower end cap 15 is an inlet baffle plate 33, which, with lower end cap 15 and the surrounding shell 13 define an inlet header 35. Hydrogen or oxygen gas to be purified flows past valve 19 through inlet line 18 in the direction of arrow 39 and into header 35, which evenly distributes the gas through inlet baffle 33.

Located immediately above inlet baffle 33 is a layer of adsorbent, or desiccant, 40. The adsorbent, or desiccant, is provided to adsorb water and other impurities before the gas streams enter the first catalyst layer. This prevents contamination of the catalyst with water or other catalyst poisons and thereby increases the capacity of the catalyst.

The adsorbent layer 40, as well as the other adsorbent layers in the column, may be composed of any material which will adsorb water and other impurities from gas streams. Such adsorbents, or "desiccants" as they are sometimes called, are well-known in the art and are exemplified by Silica Gel ($SiO_2$), Alumina ($Al_2O_3$) and Molecular Sieves (e.g. $X\ Na_2O \cdot Al_2O_3 \cdot y\ SiO_2 \cdot nH_2O$). The exact adsorbent to be used for a particular application depends, of course, upon the type and quantity of impurity as well as the quantity of water to be removed from the incoming gas stream, and its selection can be easily made by those skilled in the art.

Located above the lower adsorbent layer 40 is a catalyst layer 41. This catalyst layer is provided to remove the main gas impurity (oxygen when the major gas product is hydrogen, and hydrogen when the major gas product is oxygen) from the gas product stream by reacting the impurity with the product gas to form water. Accordingly, the particular catalyst used is one that promotes the reaction $2H_2 + O_2 \rightarrow 2H_2O$ and may be chosen from any of the known catalysts promoting this reaction. Thus, a wide variety of metals, mixtures of metals and metal alloys can be utilized in the present invention; the noble metals being generally preferred because of both their high inherent catalytic activity as well as their established long-term stability. Especially preferred metals for use in the present invention are platinum, palladium and nickel.

As appreciated in the art, catalyst beds are usually not composed entirely of the catalysts but rather a large number of individual pieces of inert material covered with a coating or containing dispersions of the catalyst. Such catalyst layer systems can be employed in the inventive column, as well as catalyst layers made entirely from the catalyst.

Located above catalyst layer 41 is a second adsorbent layer 42, which is provided to remove the water produced in the catalyst layer 41. This adsorbent layer ensures that the ultimate product gas is as water free as possible.

As shown in FIG. 1, located above the upper adsorbent layer 42 is an outlet baffle 43, which with the surrounding tank 13 and upper end cap 14 define an outlet header 45. Gas passing through upper adsorbent layer 42 passes through baffle 43 to header 45 and out of the column through purified gas conduit 26 and valve 27 in the direction of arrow 50.

After operating the inventive column for a suitable length of time, the adsorbent layers become "filled" with adsorbed water and impurities and as a result, the efficiency of the adsorbents becomes markedly reduced. Accordingly, it is necessary to periodically "regenerate" the column by desorbing the impurities and water so that the adsorbent efficiency is improved. This is accomplished by backflushing the column with purified product gas. In the apparatus shown in FIG. 1, backflushing is accomplished by closing valves 19 and 27 so that the forward flow of the gas to be purified through the column is stopped. Next, backflush valves 30 and 22 are opened and purified product gas is passed at a suitable flow-rate countercurrently through the column in the direction of arrows 51 and 52. In addition, in order to speed the regeneration process, the column can be provided with conventional heating means (not shown) which is activated during desorption to speed the desorption process.

After the adsorbent layers have been sufficiently "regenerated", backflush valves 30 and 22 are closed, the optional heating means deactivated, and inlet gas valve 19 and outlet gas valve 27 opened so that gas to be purified again flows through the column in the direction of arrows 39 and 50. As appreciated in the art, the duration of the backflushing step as well as the flowrate of the backflushing gas depends on a variety of factors and can be readily determined by simple trial and error.

In a preferred embodiment of the invention, the inventive column is provided with a plurality of adsorbent layer/catalyst layer pairs. In this embodiment, each adsorbent layer, except the first, traps the water produced in the preceding catalyst layer. The last adsorbent layer, of course, ensures that the purified product is as dry as possible. This configuration maximizes the effectiveness of the catalyst since water produced in the catalyst layers is immediately removed before the concentration of water in the gas builds. Since the water concentration in the gas is kept at a minimum, deactivation of the catalyst is also minimized.

Because of the unique placement of the adsorption agent and the catalyst, the removal of oxygen and water from a hydrogen gas stream, and the removal of hydrogen and water from an oxygen gas stream, are maximized. As the column operates, water initially contained in the gas to be purified is substantially totally removed from the incoming gas stream by the first adsorbent layer. Additionally, most of the other polar molecules, such as $CO_2$, are also removed. Thus, the gas contacting the first catalyst layer is substantially free of water, and as a result, the catalyst is not quickly deactivated. Moreover, as soon as the gas stream passes out of the catalyst layer and into the next adsorbent layer, the water formed in the catalyst layer is immediately adsorbed and thereby removed from the gas stream. Thus, not only is water vapor initially removed from the gas to be purified before it reaches the catalyst, but also water produced by the catalyst is removed to insure an almost completely dried product. Because of the unique design of the inventive column, hydrogen gas streams as pure as 99.999954% and oxygen gas streams of extremely high purity can be produced.

In a preferred embodiment of the invention, two columns according to the present invention are used to provide a continuous source of extremely pure gas. An example of such a system is more fully illustrated in FIG. 2, which schematically shows a first gas column generally indicated at 60 and a second gas column generally indicated at 61. The gas to be purified enters the system through inlet conduit 64 where it is directed by the three-way flow valve 65 into the first column inlet conduit 66. Purified gas exits the first column through first column exit conduit 67 and passes through three-way exit valve 68 to product conduit 70.

When it is desired to regenerate the first column, three-way flow valve 65 is actuated so that incoming gas flows from inlet conduit 64 to second column inlet conduit 71. Incoming gas is purified in the second column 61 and exits through second column exit conduit 75. Three-way exit valve 68 is simultaneously actuated so that purified gas from second column exit conduit 75 flows through product conduit 70, the connection between product conduit 70 and first column exit conduit 67 being closed.

At the same time that the three-way exit valve 65 and 68 are actuated, first column backflush valve 77 is opened, and backflush flow control valve 76 is adjusted to permit the small flow of purified gas necessary for regeneration. This enables part of the purified gas coming from second column 61 to flow through backflush conduit 78 into and countercurrently through first column 60. At the same time, an optional heating source (not shown) in the first column can be activated to speed the desorption of adsorbed material. The backflushing gas, together with desorbed impurities, flows out of the first column through first column backflush conduit 79 via first column backflush valve 77.

After a suitable period of time, three-way inlet valve 65 and three-way exit valve 68 are again actuated so that the incoming gas flows through the first column instead of the second column. First column backflush valve 77 is closed and second backflush valve 80 is opened. Backflush flow control valve 76, having already been properly adjusted previously, is left unchanged, thus becoming a flow control orifice. The incoming gas then flows through the first column where it is purified and most of the gas then vented through product conduit 70. A small portion of the purified gas, however, travels through backflush line 78 to backflush the second column 61 which can also be heated by a conventional heating means (not shown).

The purification columns of this inventin can be used with great advantage to upgrade the quality of the hydrogen and oxygen gas streams produced by gas generators disclosed in U.S. Pat. No. 3,410,770. The alternate stacking of dehydration agent and catalyst in the inventive columns ensure that some of the upper layers of catalysts, by remaining in dry zones, will remain effective throughout the adsorption cycle. Moreover, because the gas to be purified meets an initial layer of a dehydration agent, substantially all of the alkaline mist produced from the electrolytic generator is prevented from reaching the catalysts. This extends the useful life of the unit since it prevents the alkali from poisoning the catalyst. Moreover, in the preferred embodiment of the invention in which two columns are used alternatively, the production of extremely pure gas is very economic. This is because backflushing can completely regenerate a column within a three hour period utilizing as low as two percent of the purified gas product of one column to backflush the other column.

While the foregoing invention has been thoroughly described above, the following examples are provided to illustrate the method of producing extremely pure hydrogen and oxygen according to the present invention.

EXAMPLE 1

Figure 2:
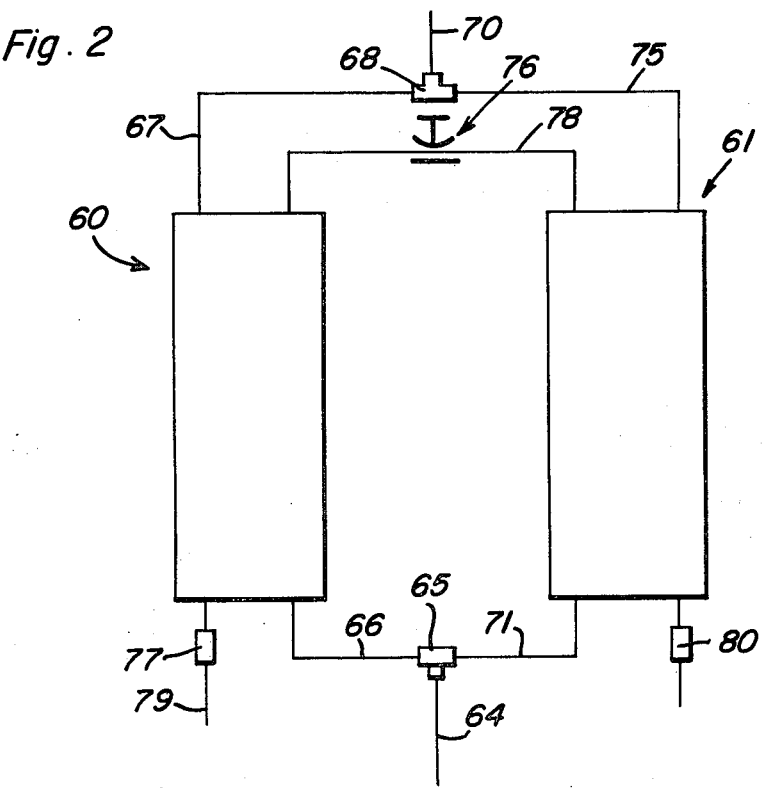
FIG. 2 is a schematic diagram illustrating the use of two inventive purification columns in a system to provide a continuous flow of purified gas.

A hydrogen purification system is constructed similar to the system illustrated in FIG. 2. Each column is made from an aluminum alloy container approximately 5.5 inches in diameter, and each container is equipped with a cylindrical heating element. Each heating element is composed of a cylindrical resistance heater, 0.75 inches in diameter, surrounded by an aluminum alloy channel-shaped heat sink about 5 inches in outer diameter, and each element is placed in the center of the cylindrical container so that openings for containing catalyst and adsorption layers are formed between the inside wall of the container and the outside surfaces of the heating element. Both columns are vertically positioned, and each column is filled with nine layers of adsorbent and eight layers of catalyst, the catalyst and adsorbent layers alternating in line with the first and last layers being adsorbent layers. Each adsorbent layer is composed of 0.9 pounds of molecular sieve spheres (Davison Grade 521, type 5A), while each catalyst layer is composed of 0.125 pounds Engelhard Type D catalyst. After the columns are assembled, each column is purged with about 2 psig nitrogen at a flow-rate of about two liters per minute for ten minutes to remove air in the columns.

A hydrogen gas source produced from an electrolytic generator similar to the one shown in U.S. Pat. No. 3,410,770 is used as the feed. The inlet gas consists of about 97.1% $H_2$, about 2.8% $H_2O$, 0.0250% $O_2$ and minute quantities of particulate $KOH/H_2O$ solution.

Incoming hydrogen gas at a flow-rate of up to 200 standard liters per minute is passed into the main inlet conduit and fed to one of the columns. After four hours, the valving system is activated so that the incoming gas is purified in the second column while the first column is being backflushed. During backflushing, the first column is heated to about 200°C. and about 2% of the gas produced by the second column is returned to the first column for backflushing purposes.

After another four hours, the valving system is again actuated so that the incoming hydrogen gas flows into the first column, while the second column is backflushed. This activation of the valving system causing the flow of incoming gas to change from one column to the other is repeated once every four hours throughout the life of the example.

After 16 hours of operation, a small portion of the product gas stream is removed and analyzed in a trace impurity style gas chromatograph. The gas sample has the following composition.

| Impurity Detected | Quantity Observed Vol. ppm (max.-min.) |
|---|---|
| $O_2$ | 0.05 – 0.2 |
| A | <0.1 |
| $N_2$ | 0.05 – 0.2 |
| CO | <0.1 |
| $CO_2$ | 0.05 |
| $H_2O$* | 0.01 – 0.10 |
| Total Hydrocarbons* | 0.1 –0.8 |
| Total Impurities | 0.46 – 1.55 |
| $H_2$ purity by difference | 99.999845 to 99.999954% |

*determined by continuous on-stream analyzer

As can be seen, the hydrogen purity of the gas stream is exceptionally high.

EXAMPLE 2

The purification system of Example 1 is operated for 3000 hours, during which time a gas sample is removed from the product stream and subjected to on-line process instrumentation for determination of values of total hydrocarbons, oxygen and water. The continual observance of less than 1 ppm $O_2$, less than 1 ppm total hydrocarbons and less than 0.1 ppm $H_2O$ indicates that substantially no deactivation of the catalyst/adsorbent has occurred.

As is evident to those skilled in the art, many modifications of the disclosed purification system can be made without departing from the spirit and scope of the invention. For example, the regeneration of the adsorbents can be accomplished by passing purified gas through the column in a forward direction instead of backflushing. However, the ultimate gas product will not be as pure if this course of action is followed. Moreover, a compressor can be provided upstream or downstream of the incoming gas conduit to increase the incoming or outgoing gas pressure, if necessary. Also, the inventive gas column can be used to purify any hydrogen or oxygen gas stream containing contaminating amounts of the other, and further containing other adsorbable materials. For example, the inventive purification system will be very effective in purifying the hydrogen gas by-product formed in the production of semi-conductor devices in epitaxial reactors. The hydrogen gas by-products of such reactors, which may be contaminated by air, are known to additionally contain water, hydrochloric acid, silicon chloride, boron trifluoride, phosphorus pentachloride and other contaminants, all of which the inventive system will effectively remove.

It should also be evident to those skilled in the art that alternative plumbing designs can satisfy the requirements of the inventive system. Moreover, the adsorbent materials employed in the inventive system can be regenerated by removing "spent" materials from the container and employing either heat or heat and vacuum for the desorptive step, thereby limiting the component requirements for purification system to a single adsorbent/purifier.

The foregoing description and examples have been presented for illustrative purposes only and are not intended to limit the present invention in any way. All reasonable modifications not specifically set forth are intended to be included within the scope of the present invention, which is to be limited only by the following claims.

We claim:

1. A process for purifying hydrogen gas containing a small amount of oxygen and a catalyst poison comprising placing a plurality of alternating contiguous layers of an adsorbent for said catalyst poison and a catalyst for catalysing the formation of water from hydrogen and oxygen in a single container, passing said hydrogen gas through said container, said layers being arranged in said container so that the first layer which the gas meets in the container and the last layer the gas meets in the container are adsorbent layers, and withdrawing a purified hydrogen gas from said container.

2. A process according to claim 1 wherein said catalyst poison is water.

3. A process according to claim 1 wherein said hydrogen gas to be purified has a water content of 1.0 to 100,000 ppm and an oxygen content of 0.1 to 40,000 ppm.

4. A process for purifying oxygen gas containing a small amount of hydrogen and a catalyst poison comprising placing a plurality of alternating contiguous layers of an adsorbent for said catalyst poison and a catalyst for catalysing the formation of water from oxygen and hydrogen in a single container, passing said oxygen gas through said container, said layers being arranged in said container so that the first layer which the gas meets in the container and the last layer the gas meets in the container are adsorbent layers, and withdrawing a purified oxygen gas from said container.

5. A process according to claim 4 wherein said catalyst poison is water.

6. A process according to claim 4 wherein said oxygen gas to be purified has a water content of 1.0 to 100,000 ppm and a hydrogen content of 0.1 to 40,000 ppm.

7. A process for continuously purifying an incoming hydrogen gas stream containing small amounts of oxygen and a catalyst poison comprising (1) establishing a first purification zone in a first column and a second purification zone in a second column, each zone comprising a plurality of alternating contiguous layers of an adsorbent for said catalyst poison and a catalyst for catalyzing the formation of water from hydrogen and oxygen, said adsorbent and catalyst layers being arranged in each column so that the first and last layers met by gas flowing through each column are adsorbent layers, (2) causing said incoming gas stream to flow into the first purification zone, (3) withdrawing a portion of the purified product from the first purification zone, (4) causing a portion of the purified product from said first purification zone to flow through the second purification zone, (5) transferring the flow of incoming gas from the first purification zone to the second purification zone, (6) withdrawing a portion of the purified product from said second purification zone, (7) causing a portion of the purified product from said second purification zone to flow through the first purification zone and (8) transferring the incoming gas stream back to the first purification zone and repeating steps 3–7.

8. A process according to claim 7 wherein said catalyst poison is water.

9. A process according to claim 7 wherein the first purification zone is backflushed with a portion of the product produced in the second purification zone and further wherein the second purification zone is backflushed with a portion of the purified product produced in the first purification zone.

10. A process for continuously purifying an incoming oxygen gas stream containing small amounts of hydrogen and a catalyst poison comprising (1) establishing a first purification zone in a first column and a second purification zone in a second column, each zone comprising a plurality of alternating contiguous layers of an absorbent for said catalyst poison and a catalyst for catalyzing the formation of water from oxygen and hydrogen, said absorbent and catalyst layers being arranged in each column so that the first and last layers met by gas flowing through each column are layers of adsorbent, (2) causing said incoming gas stream to flow into the first purification zone; (3) withdrawing a portion of the purified product from the first purification zone, (4) causing a portion of the purified product from said first purification zone to flow through the second purification zone, (5) transferring the flow of incoming gas from the first purification zone to the second purification zone, (6) withdrawing a portion of the purified product from said second purification zone, (7) causing a portion of the purified product from said second purification zone to flow through the first purification zone and (8) transferring the incoming gas stream back to the first purification zone and repeating steps 3–7.

11. A process according to claim 10 wherein said catalyst poison is water.

12. A process according to claim 10 wherein the first purification zone is backflushed with a portion of the product produced in the second purification zone and further wherein the second purification zone is backflushed with a portion of the purified product produced in the first purification zone.

13. A process according to claim 1 wherein said hydrogen gas contains a small amount of polar impurities and said absorbent is an absorbent for said polar impurities.

14. The process according to claim 1 wherein said hydrogen gas is produced in an electrolytic generator and contains alkaline impurities and said absorbent is an absorbent for said alkaline impurities.

15. The process according to claim 4 wherein said oxygen gas contains polar impurities and said absorbent is an absorbent for said polar impurities.

16. The process according to claim 4 wherein said oxygen gas is produced in an electrolytic generator and contains alkaline impurities and said absorbent is an absorbent for said alkaline impurities.

17. The process according to claim 7 wherein said incoming hydrogen gas stream contains polar impurities and said absorbent is an absorbent for said polar impurities.

18. The process according to claim 7 in which said incoming hydrogen gas stream is produced in an electrolytic generator and contains alkaline impurities and said absorbent is an absorbent for said alkaline impurities.

19. The process according to claim 10 in which said incoming oxygen gas stream contains polar impurities and said absorbent is an absorbent for said polar impurities.

20. The process according to claim 10 in which said incoming oxygen gas stream is produced in an electrolytic generator and contains alkaline impurities and said absorbent is an absorbent for said alkaline impurities.

* * * * *